US007735803B2

(12) United States Patent
Junker et al.

(10) Patent No.: US 7,735,803 B2

(45) Date of Patent: Jun. 15, 2010

(54) LOW FRICTION SLIDING VALVE SEAL

(75) Inventors: Matthew E. Junker, Farmington Hills, MI (US); John C. Green, Sterling Heights, MI (US); Robert Meilinger, Beverly Hills, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 83 days.

(21) Appl. No.: 11/129,902

(22) Filed: May 16, 2005

(65) Prior Publication Data

US 2006/0033063 A1 Feb. 16, 2006

Related U.S. Application Data

(60) Provisional application No. 60/600,843, filed on Aug. 12, 2004.

(51) Int. Cl.
*F16K 31/02* (2006.01)

(52) U.S. Cl. .............. 251/129.15; 251/355; 123/568.26

(58) Field of Classification Search ................................ 251/129.15–129.22, 355; 123/568.11–568.22, 123/568.26
See application file for complete search history.

(56) References Cited

U.S. PATENT DOCUMENTS 1,876,160 A * 9/1932 Zahodiakin .............. 123/41.33
5,465,691 A * 11/1995 Capaldo .................. 123/188.9
5,794,860 A * 8/1998 Neumann ................ 239/585.3
6,053,473 A * 4/2000 Shinobu et al. ......... 251/129.19
6,453,934 B1 9/2002 Bircann et al.
6,474,320 B1 * 11/2002 Modien ................. 123/568.21
6,481,424 B2 11/2002 Bircann et al.
6,497,226 B2 * 12/2002 Bircann et al. ......... 123/568.11
6,634,346 B2 * 10/2003 Bircann et al. ......... 123/568.21
6,655,657 B2 12/2003 Bircann
6,864,771 B2 * 3/2005 Komiyama et al. ......... 335/220
7,178,330 B2 * 2/2007 Kouzu et al. .................. 60/289
2004/0041115 A1 3/2004 Geib et al.
2004/0051067 A1 3/2004 Fujita et al.
2004/0065860 A1 4/2004 Bircann

* cited by examiner

*Primary Examiner*—John K Fristoe, Jr.
(74) *Attorney, Agent, or Firm*—Warn Partners, P.C.

(57) ABSTRACT

A solenoid valve system, wherein the valve member is provided with a seal member disposed thereabout. The solenoid valve is especially suitable for use with exhaust gas recirculation systems. The seal member is operable to slide axially relative to the valve member, including the stem portion thereof. An optional lubricant is provided between the valve member and the seal member so as to provide a relatively low friction environment therebetween when the valve member is in motion. An optional biasable member, in operable association with the seal member, is provided so as to maintain proper positioning of the seal member, e.g., during operation of the solenoid valve system.

19 Claims, 3 Drawing Sheets

LOW FRICTION SLIDING VALVE SEAL

CROSS-REFERENCE TO RELATED APPLICATION

The instant application claims priority to U.S. Provisional Patent Application Ser. No. 60/600,843, filed Aug. 12, 2004, the entire specification of which is expressly incorporated herein by reference.

FIELD OF THE INVENTION

The present invention relates generally to exhaust gas recirculation valves and more particularly to low friction sliding valve seals for use in conjunction with solenoid-actuated exhaust gas recirculation valves.

BACKGROUND OF THE INVENTION

Current Federal and State legislation generally requires control of vehicle exhaust emissions. Oxides of Nitrogen ("NOx") are one of the exhaust gas emissions that must be controlled. Formation of NOx typically occurs at higher combustion temperatures. A system, generally referred to as the exhaust gas recirculation ("EGR") system, has been developed to reduce combustion temperatures and control NOx emissions. In this type of system, a portion of the exhaust gas is recirculated back to the intake manifold where it is combined with incoming air. When this mixture is compressed and ignited in the cylinder, the result is a lower combustion temperature and a reduction in NOx.

Electric solenoids have been used to provide a number of functions in automotive applications including, but not limited to exhaust gas recirculation valves and the like. These types of systems are generally referred to as solenoid (or solenoid-actuated) exhaust gas recirculation ("SEGR") systems. These systems typically employ a selectively moveable armature member with a stem or shaft member extending therefrom with a valve member formed at an end thereof that is selectively operable to contact a valve seat so as to allow access to or deny access to, as the case may be, a housing or chamber such that the recirculated exhaust gas may or may not pass therethrough, as the case may be.

Unfortunately, the recirculated exhaust gas contains particulates and vapors (especially acidic compounds) that are potentially harmful to the various components of the solenoid (especially the electrical components) and may cause the solenoid to fail or adversely affect the performance thereof. This problem is exacerbated when any seal around the components of the solenoid valve is poor, especially around the stem member, thus allowing additional recirculated exhaust gas to infiltrate the solenoid.

Therefore, there exists a need for new and improved solenoid valves, especially those with enhanced sealing characteristics about the stem member.

SUMMARY OF THE INVENTION

In accordance with the general teachings of the present invention, new and improved solenoid valves are provided.

More specifically, a seal member is provided that is intended to substantially provide a seal function around a stem portion of a valve member extending from an armature, wherein the stem portion is received in an aperture of a housing of the solenoid valve. The seal member is axially disposed about the stem portion and is preferably slidable with respect to the stem portion so as to permit the stem portion to freely move, e.g., relative to the aperture when the armature is actuated (e.g., energized). The seal member is preferably positioned relative to the housing with an optional biasable member (e.g., a spring) wherein the seal member is urged towards a surface of the housing. A lubricant can be used to lubricate the surface between the stem portion and the seal member, the surface between the seal member and the housing, and combinations thereof. The lubricant is also intended to function as a seal to prevent or at least lessen the ingress of recirculated exhaust gases towards the solenoid.

In accordance with a first embodiment of the present invention, a solenoid valve system is provided, comprising: (1) a stem member; (2) a housing having an area defining an aperture formed in a surface thereof, at least a portion of the stem member received in the aperture; (3) a seal member axially disposed about the stem member, wherein a surface of the seal member is adjacent to a surface of the housing; and (4) a biasable member urging the seal member towards the housing.

In accordance with a second embodiment of the present invention, a solenoid valve system is provided, comprising: (1) a stem member; (2) a housing having an area defining an aperture formed in a surface thereof, at least a portion of the stem member received in the aperture; (3) a seal member axially disposed about the stem member, wherein a surface of the seal member is adjacent to a surface of the housing; and (4) a lubricant disposed in an area selected from the group consisting of an area between the stem member and the seal member, an area between the surface of the seal member and the housing, and combinations thereof.

In accordance with a third embodiment of the present invention, a solenoid valve system is provided, comprising: (1) a stem member; (2) a housing having an area defining an aperture formed in a surface thereof, at least a portion of the stem member received in the aperture; (3) a seal member axially disposed about the stem member, wherein a surface of the seal member is adjacent to a surface of the housing; (4) a lubricant disposed in an area selected from the group consisting of an area between the stem member and the seal member, an area between the surface of the seal member and the housing, and combinations thereof; and (5) a biasable member urging the seal member towards the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
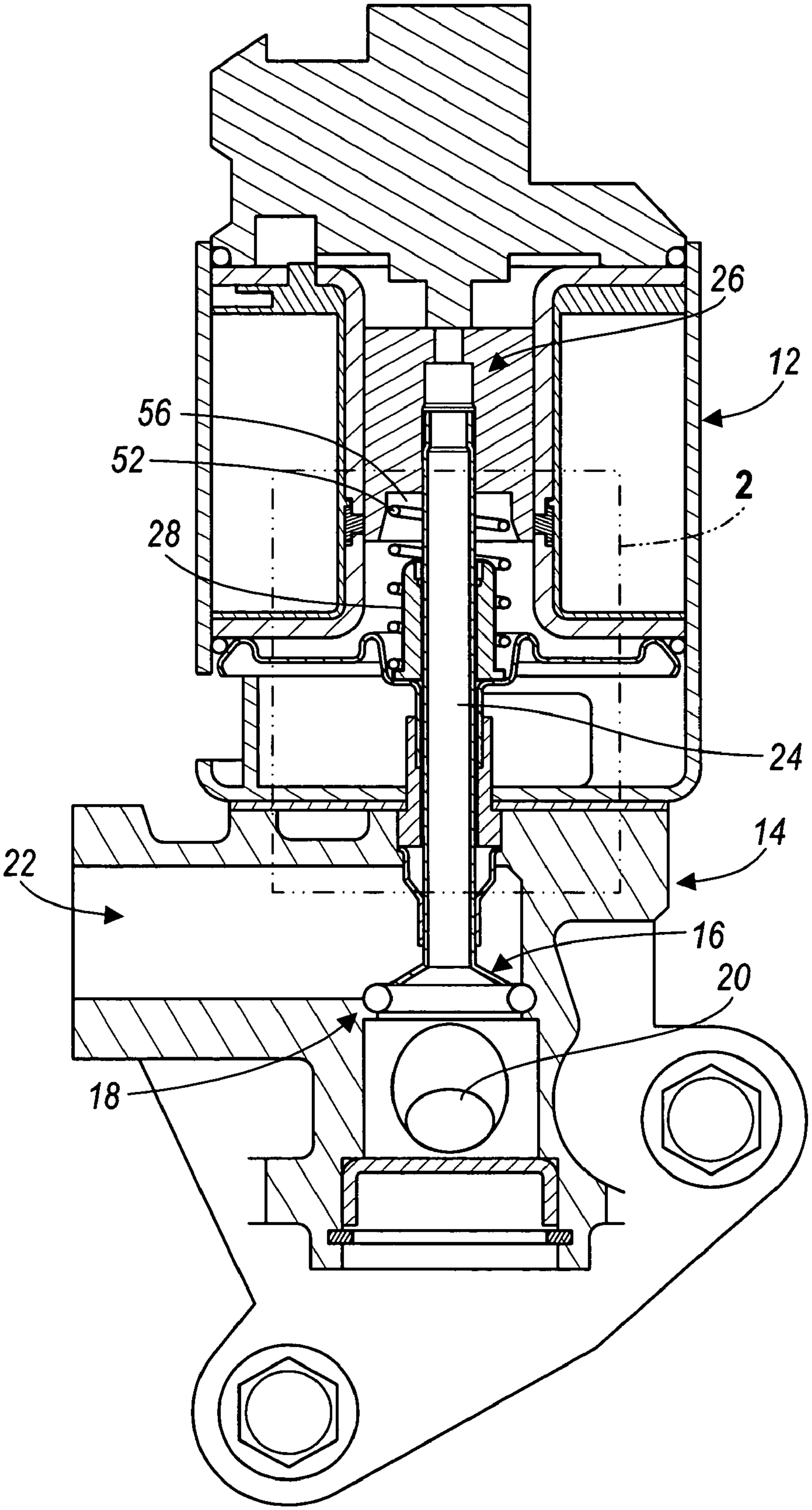
FIG. 1 illustrates a sectional view of a solenoid-actuated exhaust gas recirculation system, in accordance with the general teachings of the present invention.
Figure 2:
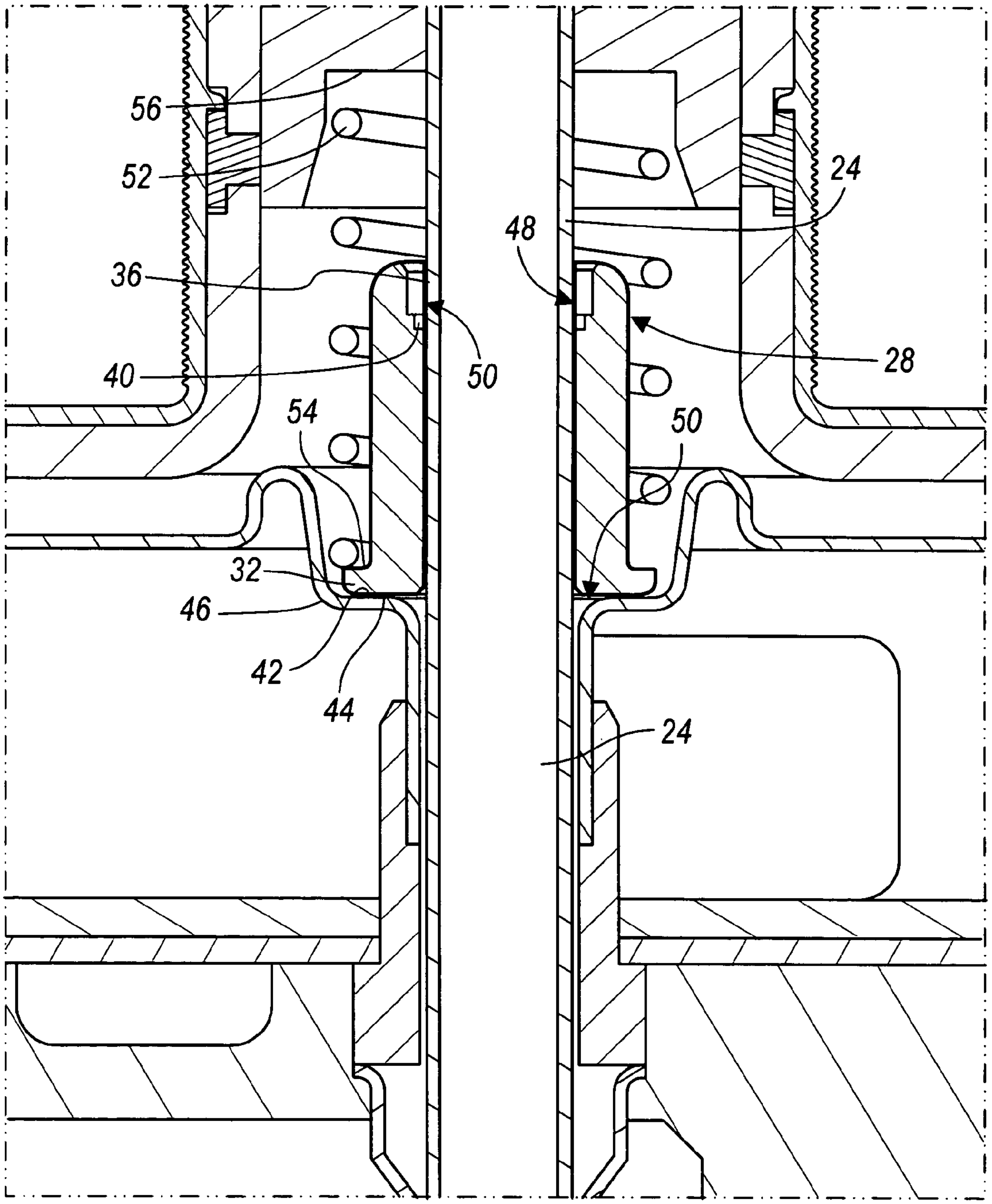
FIG. 2 illustrates a sectional view of a detailed portion of the solenoid-actuated exhaust gas recirculation system depicted in FIG. 1, in accordance with a first embodiment of the present invention.

Referring to the Figures generally, and specifically to FIGS. 1 and 2, there is shown a solenoid-actuated exhaust gas recirculation system, generally at 10. The system 10 preferably includes a solenoid system generally at 12 and an exhaust gas recirculation system generally at 14.

The solenoid system 12 preferably controls movement of a valve member 16 (e.g., a portion of a pintel, a poppet, or the like) against a valve seat 18. Movement of the valve member 16, e.g., in an axial direction (e.g., upwardly and downwardly), allows the valve member 16 to selectively engage the valve seat 18 so as to permit (or prevent) the ingress of recirculated exhaust gas from one chamber 20 to another chamber 22.

The valve member 16 is preferably associated with a stem portion 24 extending from an armature member 26 of the solenoid system 12. By selectively energizing (or de-energizing) the armature member 26, it moves in an axial direction (e.g., upwardly and downwardly), which in turn causes the stem portion 24, and of course the valve member 16, to move in a likewise direction. In this manner, the flow of recirculated exhaust gas can be carefully controlled.

Figure 3:
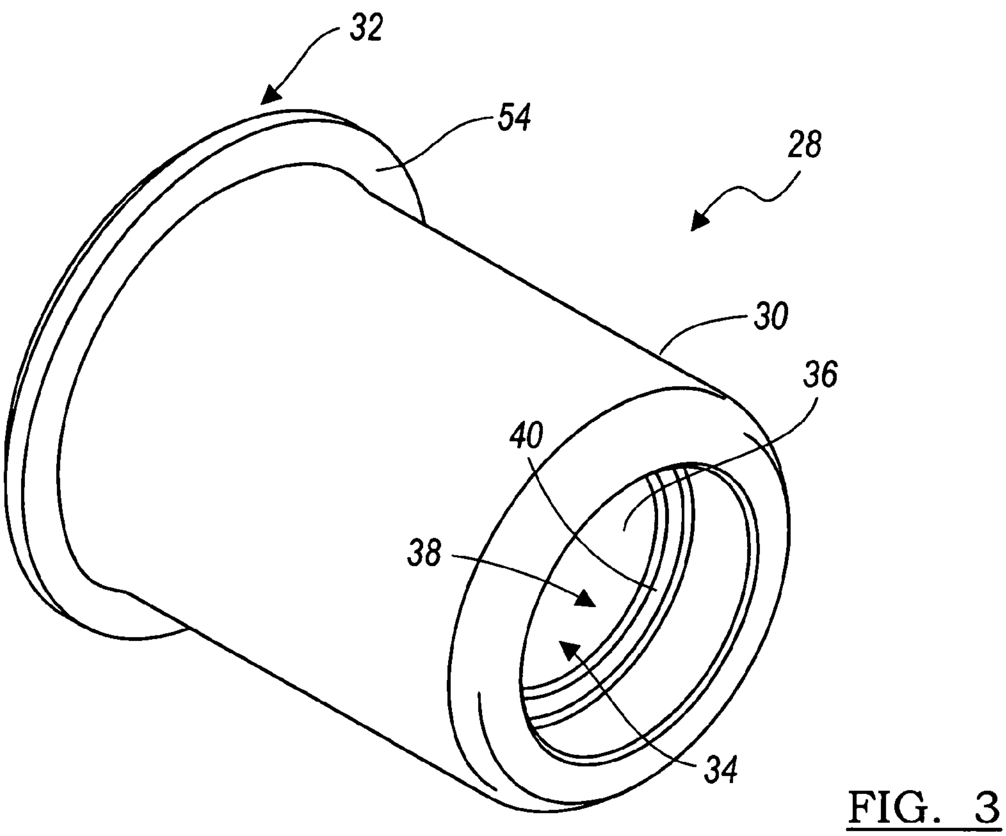
FIG. 3 illustrates a front perspective view of the seal member of the solenoid-actuated exhaust gas recirculation system depicted in FIG. 1, in accordance with a second embodiment of the present invention.
Figure 4:
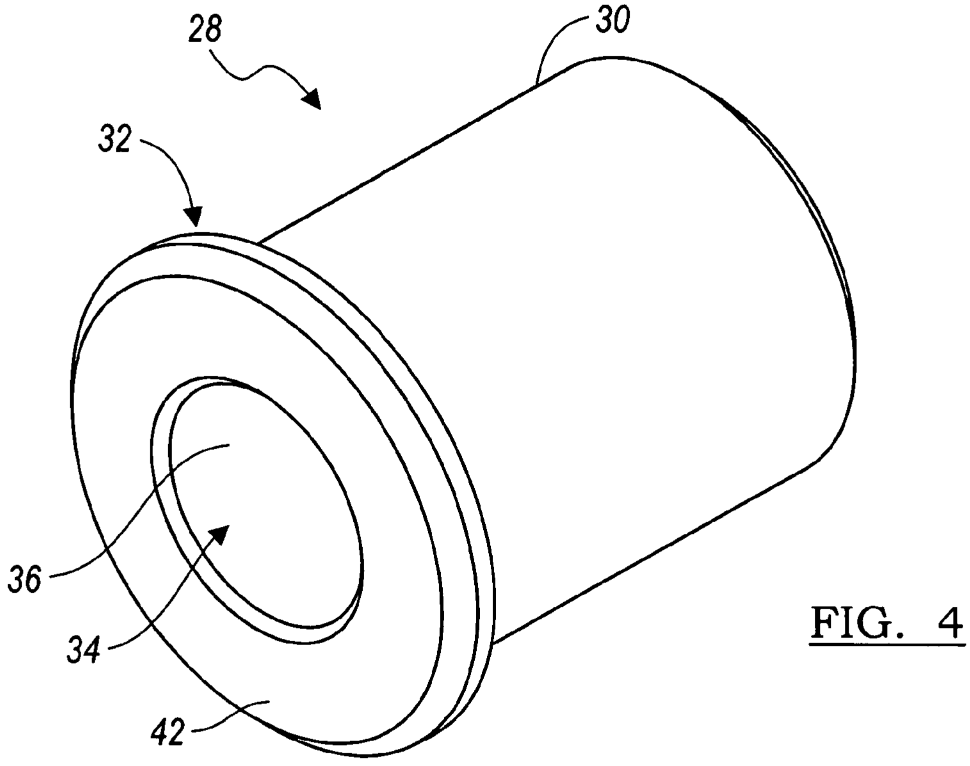
FIG. 4 illustrates a rear perspective view of the seal member of the solenoid-actuated exhaust gas recirculation system depicted in FIG. 1, in accordance with a third embodiment of the present invention.

Referring to the Figures generally, and specifically to FIGS. 3 and 4, a seal member 28 is preferably provided, in accordance with a preferred embodiment of the present invention. The seal member 28 is preferably configured in a substantially cylindrical member 30 having an annular shoulder portion 32 formed at an end thereof. The exact configuration of the seal member 28 can be modified without departing from the scope of the present invention. By way of a non-limiting example, frusto-conical configurations or the like, can also be employed in the practice of the present invention.

An area defining a throughbore 34 is preferably provided along an axial portion of the seal member 28. On an inner surface 36 of the throughbore 34, a textured portion 38 is provided thereon. The textured portion 38 can include, without limitation, grooves 40 and/or the like, the purpose of which will be explained herein.

The seal member 28 is preferably operable to be disposed about the stem portion 24, i.e., the stem portion 24 is preferably operable to be received within the throughbore 34 of the seal member 28. Preferably, the stem portion 24 is tightly received in the throughbore 34, but not so tightly that the stem portion 24 cannot move axially relative to the throughbore 34. In accordance with a preferred embodiment of the present invention, both the stem portion 24 and the seal member 28 are slidable (e.g., axially) relative to one another.

A lower surface 42 of the shoulder portion 32 of the seal member 28 is preferably adjacent to a surface 44 of a housing 46 (or sub-housing, chamber, or the like) of the solenoid system 12. The inner surface 36 of the throughbore 34 of seal member 28 is preferably adjacent to the outer surface 48 of the stem portion 24.

In order to provide a low friction level between the stem portion 24 and the seal member 28, e.g., when the stem portion 24 is in motion, a lubricant material 50 is preferably provided between the inner surface 36 of the throughbore 34 of seal member 28 and the outer surface 48 of the stem portion 24. Additionally, the lubricant material 50 can also function as a sealant. By way of a non-limiting example, the lubricant material 50 can preferably be provided between the lower surface 42 of the shoulder portion 32 of the seal member 28 and the surface 44 of the housing 46.

Without being bound to a particular theory of the operation of the present invention, the grooves 40 preferably aid in the retention of the lubricant material 50 in the area between the inner surface 36 of the throughbore 34 of seal member 28 and the outer surface 48 of the stem portion 24. It should be appreciated that the exact location of the grooves 40 can be varied with respect to the inner surface 36 of the throughbore 34.

The exact composition of the lubricant material 50 is not thought to be critical to the success of the present invention, provided that it provides the requisite lubrication and/or sealing functions discussed above. In accordance with a preferred embodiment of the present invention, the lubricant material should have a viscosity in the range of about 140 centistokes (cSt) or higher. By way of a non-limiting example, any type of high temperature grease can be used in the practice of the present invention, including those readily commercially available from Nye Lubricants (Fairhaven, Mass.) under the trade name UNIFLOR 8981.

In order to maintain the proper positioning of the seal member 28, an optional biasable member 52 (e.g., a spring) is preferably employed so as to urge against the upper surface 54 of the shoulder portion 32 of the seal member 28 towards the surface 44 of the housing 46. The other end of the biasable member 52 preferably rests against a spaced and opposed surface 56 of the housing 46.

In this manner, the shoulder portion 32, and any lubricant material 50 adjacent thereto, forms a seal with the surface 44 of the housing 46, e.g., especially when the stem portion 24 is in motion. Thus, when the stem portion 24 is in motion, e.g., when the solenoid system 12 is actuated, the seal member 28 preferably remains substantially stationary with respect to the stem portion 24, i.e., the stem portion 24 is operable to freely slide relative to the seal member 28, as well as the surface 44 of the housing 46. In this manner, the seal member 28 prevents, or at least substantially prevents the ingress of recirculated exhaust gas (or other fluids and/or contaminants) into the various portions of the solenoid system 12.

It should be appreciated that the seal member 28 can also be employed without resort to use of the lubricant material 50. By way of a non-limiting example, the seal member 28 would provide a reduced clearance area that would inhibit movement of air (or any other type of fluid) into the solenoid system 12.

Although the present invention has been described with primary reference to axial movement of a valve system, it should be appreciated that the present invention can also be practiced with rotary movement of a valve system, or for that matter, any valve system wherein infiltration of contaminants into a particular portion of the valve system (e.g., a solenoid portion thereof) is not desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid valve system, comprising:

a stem member;

a solenoid system operably connected to said stem member, said solenoid system having a housing and a seal member contained in said housing of said solenoid system, wherein said housing has an area defining an aperture formed in a surface thereof, at least a portion of the stem member received in the aperture;

said seal member axially disposed about the stem member, wherein a surface of the seal member is adjacent to a surface of the housing, wherein the seal member is operable to prevent the ingress of fluids between said valve stem and said seal member into the solenoid system;

an axial throughbore formed as part of said seal member, at least a portion of said stem member extending through said axial throughbore;

a textured portion having one or more grooves formed on an inner surface of said axial throughbore, wherein said textured portion contacts said stem member and creates a low friction seal between said seal member and said valve stem that provides a seal between said seal member and said valve stem, and low friction movement of said valve stem relative to said seal member;

a lubricant disposed in an area selected from the group consisting of an area between the stem member and the seal member, an area between the surface of the seal member and the housing, and combinations thereof, said one or more grooves being operable to aid in the retention of said lubricant in the area between the inner surface of said axial throughbore of said seal member and an outer surface of said stem member; and a biasable member urging the seal member towards the housing, said biasable member being in contact with said seal member.

2. The invention according to claim 1, wherein the seal member includes a substantially cylindrical configuration having said axial throughbore formed therethrough.

3. The invention according to claim 2, wherein the stem member is at least partially received in the throughbore.

4. The invention according to claim 1, wherein the seal member includes an annular shoulder portion, and a lower surface of said annular shoulder portion is adjacent to a surface of said housing.

5. The invention according to claim 4, wherein the biasable member engages the annular shoulder portion.

6. The invention according to claim 1, further comprising an exhaust gas recirculation system operably associated with the solenoid system, wherein said fluids include recirculated exhaust gas.

7. The invention according to claim 1, wherein the stem member and the seal member are axially slidable relative to one another.

8. A solenoid valve system, comprising:

a stem member;

a solenoid system operably connected to said stem member, said solenoid system having a housing and a seal member contained in said housing of said solenoid system, wherein said housing has an area defining an aperture formed in a surface thereof, at least a portion of the stem member received in the aperture;

said seal member axially disposed about the stem member, wherein a surface of the seal member is adjacent to a surface of the housings wherein the seal member is operable to prevent the ingress of fluids between said valve stem and said seal member into the solenoid system;

an axial throughbore formed as part of said seal member, at least a portion of said stem member extending through said axial throughbore;

a textured portion having one or more grooves formed on an inner surface of said axial throughbore, wherein said textured portion contacts said stem member and creates a low friction seal between said seal member and said valve stem that provides a seal between said seal member and said valve stem, and low friction movement of said valve stem relative to said seal member;

a lubricant disposed in an area selected from the group consisting of an area between the stem member and the seal member, an area between the surface of the seal member and the housing, and combinations thereof, said one or more grooves being operable to aid in the retention of said lubricant in the area between the inner surface of said axial throughbore of said seal member and an outer surface of said stem member; and a biasable member urging the seal member towards the housing, said biasable member being in contact with said seal member.

9. The invention according to claim 8, said annular seal member further comprising an annular shoulder portion, wherein the biasable member engages the annular shoulder portion, and a lower surface of said annular shoulder portion is adjacent to a surface of said housing.

10. The invention according to claim 8, wherein the seal member includes a substantially cylindrical configuration having said axial throughbore formed therethrough.

11. The invention according to claim 10, wherein the stem member is at least partially received in the axial throughbore.

12. The invention according to claim 8, further comprising an exhaust gas recirculation system operably associated with the solenoid system, wherein said fluids include recirculated exhaust gas.

13. The invention according to claim 8, wherein the stem member and the seal member are axially slidable relative to one another.

14. A solenoid valve system, comprising:

a stem member;

a solenoid system operably connected to said stem member, said solenoid system having a housing and a seal member contained in said housing of said solenoid system, wherein said housing has an area defining an aperture formed in a surface thereof, at least a portion of the stem member received in the aperture;

said seal member of a substantially cylindrical configuration and axially disposed about the stem member, wherein a surface of the seal member is adjacent to a surface of the housing wherein the seal member is operable to prevent the ingress of fluids between said valve stem and said seal member into the solenoid system;

an axial throughbore formed as part of said seal member, at least a portion of said stem member extending through said axial throughbore;

a textured portion having one or more grooves formed on an inner surface of said axial throughbore, wherein said textured portion contacts said stem member and creates a low friction seal between said seal member and said valve stem that provides a seal between said seal member and said valve stem, and low friction movement of said valve stem relative to said seal member;

a lubricant disposed in an area selected from the group consisting of an area between the stem member and the seal member, an area between the surface of the seal member and the housing, and combinations thereof thereof, said one or more grooves being operable to aid in the retention of said lubricant in the area between the inner surface of said axial throughbore of said seal member and an outer surface of said stem member; and a biasable member urging the seal member towards the housing, said biasable member being in contact with said seal member.

15. The invention according to claim 14, wherein the stem member is at least partially received in the axial throughbore.

16. The invention according to claim 14, wherein the seal member includes an annular shoulder portion, and a lower surface of said annular shoulder portion is adjacent to a surface of said housing.

17. The invention according to claim 16, wherein the biasable member engages the annular shoulder portion.

18. The invention according to claim 14, further comprising an exhaust gas recirculation system operably associated with the solenoid system, wherein said fluids include recirculated exhaust gas.

19. The invention according to claim 14, wherein the stem member and the seal member are axially slidable relative to one another.

* * * * *

UNITED STATES PATENT AND TRADEMARK OFFICE

CERTIFICATE OF CORRECTION

PATENT NO. : 7,735,803 B2
APPLICATION NO. : 11/129902
DATED : June 15, 2010
INVENTOR(S) : Junker et al.

It is certified that error appears in the above-identified patent and that said Letters Patent is hereby corrected as shown below:

Column 5,
Line 64, Claim 8, “housings” should be -- housing --.

Column 6,
Line 67, Claim 14, “thereof thereof,” should be -- thereof, --.

Signed and Sealed this

Ninth Day of November, 2010

David J. Kappos
*Director of the United States Patent and Trademark Office*